Patented Jan. 30, 1945

2,368,366

UNITED STATES PATENT OFFICE 2,368,366

PROCESS FOR THE PRODUCTION OF LACTONES

Lucas P. Kyrides, Webster Groves, and John K. Craver, Affton, Mo., assignors to Monsanto Chemical Company, St. Louis, Mo., a corporation of Delaware No Drawing. Application August 21, 1942, Serial No. 455,620

5 Claims. (Cl. 260—344)

The present invention relates to the production of lactones from keto-substituted carboxylic acids, and refers particularly to the production of gamma-lactones such as gamma-valerolactone by the catalytic liquid-phase hydrogenation of gamma-keto carboxylic acids such as levulinic acid.

Valerolactone, which, when referred to herein is to be understood to designate gamma-valerolactone (also known as n-valerolactone, 1,4-pentanolid and 4-hydroxypentanoic lactone), has heretofore been prepared by the reduction of levulinic acid. The following reduction methods have been reported:

1. Reduction in aqueous solution by means of sodium amalgam. Wolff (Annalen, 1881, vol. 208, page 104) used about 60 grams of 4% sodium amalgam for the reduction of 1 gram of acid. See also Berkenheim and Dankova, J. Gen. Chem. (U. S. S. R.), 1939, vol. 9, pages 924-31; Chem. Abs., 1940, vol. 34, page 368.

2. Vapor-phase hydrogenation over solid contact catalysts. Sabatier and Mailhe (Ann. chim. phys., 1909, series 8, vol. 16, page 77), passed hydrogen through heated levulinic acid maintained at about its boiling point (239° C.) and directed the resulting vapor stream over a nickel catalyst heated to 250° C. It was found that decomposition takes place as valerolactone approaches its boiling point at atmospheric pressure (Schuette and Thomas, J. Amer. Chem. Soc., 1930, vol. 52, pages 2028-30), hence this process is not advantageous for the commercial production of the lactone (see Schuette and Thomas, J. Amer. Chem. Soc., 1930, vol. 52, pages 3010-1). The boiling point of valerolactone is about 206° C. and decomposition was noted at about 170° C.

3. Electrolytic reduction; in acid solution the predominant product is n-valeric acid while in alkaline solution, gamma-hydroxyvaleric acid or the lactone is produced. (Tafel and Emmert, Z. Elektrochem., 1911, vol. 17, pages 569-72; Chem. Abs., 1912, vol. 6, pages 865, 1282. See also, Berkenheim and Dankova, loc. cit.)

4. Reduction with sodium in other solvents. Losanitsch (Monatshefte, 1914, vol. 35, pages 301-6) used absolute alcohol. Schuette and Sah (J. Amer. Chem. Soc., 1926, vol. 48, pages 3163-5) used 95% ethyl alcohol at the start; their reported yield was 60%. Care must be exercised so that the lactone is not reduced further (see Berkenheim and Dankova, loc. cit.).

5. Catalytic liquid-phase hydrogenation in solvents. Schuette and Thomas (J. Amer. Chem. Soc., 1930, vol. 52, page 3010) carried out the hydrogenation at room temperatures and at pressures of about 2 to 3 atmospheres in various anhydrous solvents and in the presence of platinum oxide catalysts. The best yield (87%) was obtained when the solvent was ether; ethyl alcohol gave a 52% yield and acetic acid gave a 48% yield. Packendorff (Berichte, 1934, vol. 67, pages 905-8) dissolved 10 grams of levulinic acid in 30 cc. alcohol, added 0.5 grams platinized (15%) charcoal, 2 cc. of a chloroplatinic acid solution (about 0.1 gram platinum) and, while hydrogenating this mixture, added hydrochloric acid intermittently. The yield was 2.5 grams of lactone.

6. Catalytic hydrogenation of the sodium salt in aqueous solution. Allen, Wyatt and Henze (J. Amer. Chem. Soc. 1939, vol. 61, pages 843-6) hydrogenated an aqueous solution of sodium levulinate containing an excess of sodium hydroxide in the presence of a Raney nickel catalyst. The temperature reached was 250° C. and the pressure 325 atmospheres. The hydrogenated product contained the sodium salt of gamma-hydroxyvaleric acid, which was then converted to and recovered as gamma-valerolactone. The yield was 84.1%.

The inapplicability of many of the foregoing methods to the industrial production of lactones is obvious. Certain of the methods which have been reported to produce good yields do not readily lend themselves to advantageous industrial adaptation. Catalyst life, for example, is an important consideration in all industrial processes.

Lactones are plasticizers for cellulose derivatives and intermediates for the production of other compounds. The use of gamma-butyrolactone and gamma-valerolactone as plasticizers for nitrocellulose and acetylcellulose and solvents for resins is described in German Patent No. 501,889 (Frdl. 17, 1811).

The principal object of the present invention is to provide an improved process of preparing gamma-lactones such as gamma-valerolactone from gamma-keto carboxylic acids such as levulinic acid by catalytic hydrogenation. It is a further object of the invention to provide such a process and a catalyst therefor, which catalyst shall be characterized by low cost and long life. It is also an object of the invention to provide such a process which will provide a high yield of product and in which a maximum amount of keto carboxylic acid can be hydrogenated in a particular reaction unit, that is, a process in which the use of solvents and diluents is unnecessary. Another object of the invention is to provide a hydrogenating process in which the recovery of the lactone can be made in a simple manner, that is, without subsequent reactions, for example, as in many of the heretofore known methods in which, after hydrogenation, sodium hydroxyvalerate must be converted to valerolactone. Other objects and advantages of the invention, some of which are referred to more specifically hereinafter, will be apparent to those skilled in the art.

We have discovered that levulinic acid (gamma-ketovaleric or beta-acetopropionic acid) and similar gamma-keto carboxylic acids can be hydrogenated catalytically to gamma lactones, in the absence of solvents, by the use of Raney nickel and similar nickel catalysts at temperatures within the range of approximately 150° C. to 250° C. and preferably between approximately 175° C. and 200° C. at pressures of approximately 500 to 1500 pounds per square inch (approximately 33 to 100 atmospheres). Contrary to expectations, a very active catalyst is not required and the catalyst has a long life in the process under these reaction conditions. Hydrogenation catalysts are usually considered to have a short life in the presence of water, acids, and acid anhydrides. The yield of keto acid converted to lactone by the process of the invention is high. By observing the reaction conditions specified herein there is little danger of hydrogenating the lactone to higher hydrogenation products. The crude hydrogenated reaction mixture contains the product in the desired form and no subsequent chemical reactions but mere physical purification methods are required for recovering it in a purer form.

A number of reaction mechanisms, involving the formation of various intermediate products, have been proposed for the reduction of levulinic acid to valerolactone. According to one theory, hydroxyvaleric acid is the intermediate and the reaction may be represented as:

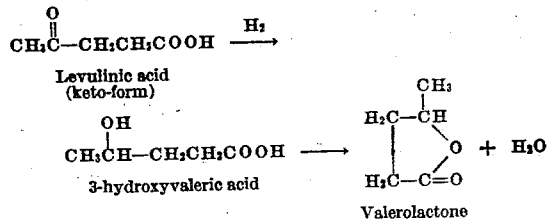

Another theory of the mechanism is based on the hydrogenation of the enol form of levulinic acid, as contrasted with the keto form in the foregoing equation. According to this second mechanism, it is only the enol form which is hydrogenated directly to valerolactone, as represented by the following:

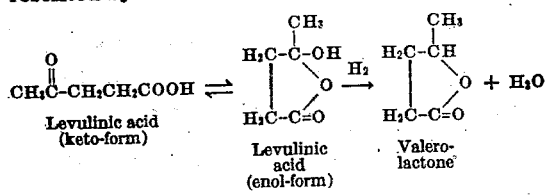

Although we do not wish to be limited by any theory of the reaction, we merely refer to the two foregoing theories for possible explanation of some of the results heretofore obtained and as pointing out some of the possible differences in our process from those heretofore reported. The existence of both a keto and an enol form of levulinic acid has been established by various reactions.

In the practice of the invention, according to preferred embodiments thereof, the levulinic acid or other gamma-keto carboxylic acid which is to be hydrogenated is charged to an autoclave, which is preferably provided with a stirrer or some other provision is made for suitable agitation. The autoclave should be constructed or lined with a resistant material. For this purpose, nickel, Allegheny metal or other suitable alloy autoclaves are preferably used or the autoclave is lined with such resistant metals or alloys. The catalyst is added to the batch and the mixture is hydrogenated while it is heated gradually to a temperature of approximately 150° C. to 250° C., and preferably to a temperature within the range of approximately 175° to 200° C. The hydrogen pressure during the heating should be maintained at between about 500 and 1500 pounds per square inch and preferably about 900 pounds per square inch. After the hydrogenation is completed, which can be estimated from the increase in weight of the batch or from the weight of hydrogen which has been charged to the autoclave or until there is no further pressure decrease during the hydrogenation, the autoclave is allowed to cool. The contents are removed and the catalyst is separated by filtration, decantation or centrifugation. The catalyst-free crude reaction mixture is thereafter subjected to fractional distillation to recover the lactone in pure form. The lactone can be subjected to further purification treatment, if desired, in manners known to the art. The recovered catalyst may be used repeatedly for further hydrogenations until it no longer is active. In reusing such catalysts increasingly higher temperatures of hydrogenation may be necessary to compensate for losses in activity.

Specific embodiments of the process of the invention are illustrated in the examples which follow:

*Example 1*

Six mols (700 grams) of technical levulinic acid (98 to 99%) and 15 grams of a nickel catalyst prepared by decomposing nickel formate in a high-boiling mineral oil at 240° to 245° C. under reduced pressure (so as to remove the gaseous products of decomposition) were charged to a silver-plated autoclave. A cylinder of hydrogen under pressure was attached to the sealed autoclave and the pressure was maintained throughout the reaction at 900 pounds per square inch. The autoclave was heated while the reaction mixture was stirred slowly, and the hydrogenation was allowed to proceed at a maximum temperature of 185° C. After the absorption of hydrogen was complete, that is, after there was no further pressure decrease on heating (which was after about 4½ hours), the autoclave and its contents were allowed to cool.

The catalyst was thereafter filtered from the reaction mixture. The catalyst-free reaction mixture was then distilled under moderate vacuum (pressure of 100 mm. of mercury) through a fractionating column. The water which first comes over (at a distillation temperature of 50° to 55° C. a 100 mm.) was collected and weighed. The pressure was then reduced further (to about 60 mm.) and the valerolactone was collected. The boiling point of valerolactone was about 115° to 120° C. at 60 mm. Valerolactone should be distilled at temperatures below about 150° C. to avoid the possibility of any decomposition. The product was redistilled.

The yields obtained in this example were about 100 grams (approximately 92.7% of the theoretical yield) of water and 556 grams (approximately 93.0% of the theoretical yield) of valerolactone. A small amount of hard, brown residue was obtained in the distillation. The silver-plating in the autoclave showed signs of attack. The redistilled valerolactone had the following properties:

| | |
|---|---|
| Assay _____Per cent__ | 99.98 |
| Crystallizing point _____°C__Approx. | —31 |
| Distillation: | |
| 1st drop _____°C__ | 205.2 |
| Dry point _____°C__ | 206.6 |
| 95% within (1–96 cc.) _____°C__ | 1 |
| (205.4° to 206.4° C.) | |
| Specific gravity (25° C.) _____ | 1.0518 |
| Refractive index (25° C.) _____ | 1.4301 |
| Viscosity (25° C.) _____centipoises__ | 2.18 |

*Example 2*

The foregoing example was repeated in an iron autoclave using a maximum reaction temperature of 175° C. The yield of valerolactone was slightly lower, being 507 grams or 85.0% of the theoretical yield. The water collected weighed 91.0 grams or 84.4% of the theoretical yield. The iron autoclave showed signs of attack.

*Example 3*

The foregoing examples were repeated in a steel autoclave lined with Allegheny metal, using the catalyst recovered from Example 2 and a temperature of reaction of 200° C. The yields were 105.8 grams of water (98.0% of theoretical) and 515.5 grams of valerolactone (86.0% of theoretical). Autoclave corrosion or attack was negligible.

*Example 4*

The procedure of Example 1 was repeated in an autoclave lined with Allegheny metal. A small amount of sodium hydroxide solution (2 cc. of 10% sodium hydroxide solution) was added to the reaction mixture during hydrogenation. The temperature was 185° C. during hydrogenation.

The recovery was 95.0 grams (88.0% of theoretical) of water and 554 grams (92.4% of theoretical) of valerolactone. The residue of the distillation was soft and was easily washed out with water.

The catalysts which may be used in the hydrogenation are low-temperature hydrogenation catalysts, preferably nickel catalysts, such as Raney nickel catalysts (described in Patents No. 1,563,587; 1,628,190; and 1,915,473), catalysts resulting from the hydrolysis of alloys of nickel and magnesium or nickel and alkaline-earth metals (described in Bertsch Patent No. 2,132,389) catalysts resulting from the decomposition of nickel compounds in inert liquids (for example, a catalyst resulting from the decomposition of nickel formate in mineral oil, as described in the examples or in Ellis Patent No. 1,296,496) and nickel catalysts prepared by the controlled hydrolysis of alloys of nickel and hydrolyzable metals in the presence of an inert organic liquid, as described in the application of John H. Hahn, Serial No. 269,179, filed April 21, 1939. Although nickel is the preferred catalytic metal, cobalt catalysts or other metallic low-temperature hydrogenation catalysts may be used.

The proportion of the catalysts which should be used may be varied considerably from the amount disclosed in the foregoing examples. This is controlled to a great extent by the nature of catalyst, the previous history of the catalyst, and the rate at which the hydrogenation is to be effected, as well as the hydrogenation conditions which are to be used.

Alkalies such as sodium hydroxide and sodium carbonate or organic bases such as aniline may be added to the hydrogenation mixture, as illustrated in Example 4.

The process of the invention is particularly adapted to the hydrogenation of gamma-keto carboxylic acids in the absence of water or organic solvents and renders the use of these materials unnecessary. However, we do not intend that our invention be limited thereto, since the presence of such materials may in some instance not be detrimental to the yield or to the quality of product.

Although the foregoing description is directed specifically to the production of valerolactone from levulinic acid, other gamma-keto carboxylic acids may be likewise hydrogenated according to the process to yield gamma-lactones. Thus, for example, the process of the invention is adaptable in general to the hydrogenations of the following typical acids to the corresponding lactones:

Levulinic acid,

Product: Valerolactone;

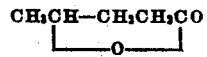

Alpha-methyllevulinic acid,

Product: Alpha,gamma-dimethylbutyrolactone,

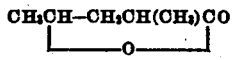

Alpha-ethyllevulinic acid,

Product: Alpha-ethylbutyrolactone,

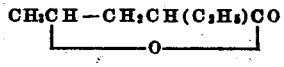

Mesitonic acid,

Product: Alpha-dimethyl-gamma-valerolactone,

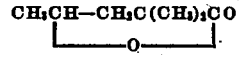

Gamma-ketostearic acid,

Product: Gamma-stearolactone,

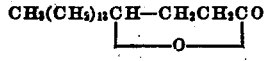

The foregoing keto-carboxylic acids may be represented generally as

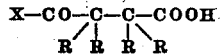

in which the R's represent hydrogen or the same or different alkyl radicals and X represents an alkyl radical.

Inasmuch as the foregoing description comprises preferred embodiments of the invention, it is to be understood that these embodiments are merely exemplary and not restrictive, and that the conditions specified herein may be varied without departing substantially from the invention or the scope of the appended claims.

We claim:

1. The process of producing a gamma-lactone which comprises the liquid-phase hydrogenation of a gamma-keto carboxylic acid in the presence of a nickel hydrogenation catalyst and substantially in the absence of other substances.

2. The process of producing a gamma-lactone which comprises the liquid-phase hydrogenation of an acid of the general formula:

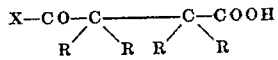

in which X is an alkyl group and the R's are selected from the group consisting of hydrogen and alkyl radicals in the presence of a nickel hydrogenation catalyst and substantially in the absence of other substances.

3. The process of producing a gamma-lactone which comprises the liquid-phase hydrogenation of an acid of the general formula:

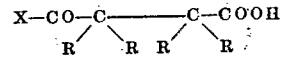

in which X is an alkyl group and the R's are selected from the group consisting of hydrogen and alkyl radicals, at a temperature within the range of approximately 150° to 250° C. and at a pressure within the range of approximately 500 to 1500 pounds per square inch, in the presence of a nickel hydrogenation catalyst and substantially in the absence of other substances.

4. The process of producing gamma-valerolactone which comprises the liquid-phase hydrogenation of levulinic acid at a temperature within the range of approximately 150° C. to 250° C. and at a pressure within the range of approximately 500 to 1500 pounds per square inch in the presence of a nickel hydrogenation catalyst and substantially in the absence of other substances.

5. The process of producing gamma-valerolactone which comprises the liquid-phase hydrogenation of levulinic acid at a temperature within the range of approximately 175° to 200° C. and at a pressure within the range of about 750 to 1000 pounds per square inch in the presence of a nickel hydrogenation catalyst and substantially in the absence of other substances.

LUCAS P. KYRIDES.
JOHN K. CRAVER.